US007613548B2

(12) United States Patent
Cardinal et al.

(10) Patent No.: US 7,613,548 B2
(45) Date of Patent: Nov. 3, 2009

(54) SYSTEMS AND METHODS FOR CONTROLLING A RAMP RATE OF A WIND FARM

(75) Inventors: Mark Edward Cardinal, Altamont, NY (US); Reinhard Brügger, Gronau (DE); Andreas Kirchner, Wallenhorst (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/341,339

(22) Filed: Jan. 26, 2006

(65) Prior Publication Data

US 2007/0173982 A1   Jul. 26, 2007

(51) Int. Cl.
G06F 19/00 (2006.01)
G05D 3/12 (2006.01)

(52) U.S. Cl. ............................ 700/286; 361/62; 290/44

(58) Field of Classification Search ................. 700/286; 361/62; 290/44
See application file for complete search history.

(56) References Cited

U.S. PATENT DOCUMENTS

| | | | | |
|---|---|---|---|---|
| 5,155,375 A | * | 10/1992 | Holley | 290/44 |
| 6,858,953 B2 | * | 2/2005 | Stahlkopf | 290/44 |
| 6,927,503 B2 | * | 8/2005 | Enis et al. | 290/55 |
| 7,002,260 B2 | | 2/2006 | Stahlkopf | |
| 7,183,664 B2 | * | 2/2007 | McClintic | 290/55 |
| 7,199,482 B2 | | 4/2007 | Hopewell | |
| 7,199,486 B2 | * | 4/2007 | Roskey | 290/55 |
| 7,227,275 B2 | * | 6/2007 | Hennessy et al. | 290/55 |
| 2002/0000723 A1 | * | 1/2002 | Weitkamp | 290/44 |
| 2003/0127862 A1 | * | 7/2003 | Weitkamp | 290/44 |
| 2003/0160457 A1 | * | 8/2003 | Ragwitz et al. | 290/44 |
| 2004/0207207 A1 | * | 10/2004 | Stahlkopf | 290/44 |
| 2006/0132993 A1 | * | 6/2006 | Delmerico et al. | 361/20 |
| 2006/0171086 A1 | * | 8/2006 | Hennessy et al. | 361/62 |

OTHER PUBLICATIONS

"Short-Term prediction of power production from wind farms" -Landberg, Riso National Laboratory, Wind Energy and Atmosphereic Physics Department, Denmark—Jan. 1997.*
"Short-Term prediction of local wind conditions" -Landberg, Riso National Laboratory, Wind Energy and Atmosphereic Physics Department, Denmark—2001.*

* cited by examiner

*Primary Examiner*—Michael D Masinick
(74) *Attorney, Agent, or Firm*—James McGinness, Esq.; Armstrong Teasdale LLP

(57) ABSTRACT

A method for controlling a ramp rate of a wind farm is described. The method includes predicting an initial predicted power to be output by a wind farm including a wind turbine.

19 Claims, 6 Drawing Sheets

SYSTEMS AND METHODS FOR CONTROLLING A RAMP RATE OF A WIND FARM

BACKGROUND OF THE INVENTION

The invention relates generally to wind power generation, and more particularly to systems and methods for controlling a ramp rate of a wind farm.

A wind power generation system generally includes a wind farm having a plurality of wind turbine generators supplying power to a utility grid. Collective power output of the wind farm is greatly influenced by wind conditions on individual wind turbine generators. Utilities often have other power resources, such as thermal power plants to balance their electrical loads, thus accommodating variability in wind conditions during intermittent wind conditions. Thermal power plants may include, for example, coal and gas fired stations. Power fluctuation of wind farms due to gusty or low wind conditions is usually dealt with by adjusting power output of these thermal power plants to provide relatively constant overall power matching demands.

However, it is often difficult to change power output of thermal power plants instantaneously. Thermal power generators utilize a rate of change of power that does not impose excessive thermal stresses, and that accommodate a plurality of natural lag times involved in heating and cooling a plurality of heat transfer components of the thermal power generators. As an example, coal-fired power stations may take over 12 hours to start from cold, and, even when hot, may take 2 to 3 hours to change from 0-100% of their rated power. Accordingly, rate of change of power used by the thermal power generators cannot be easily controlled.

BRIEF DESCRIPTION OF THE INVENTION

In one aspect, a method for controlling a ramp rate of a wind farm is described. The method includes predicting an initial predicted power to be output by the wind farm including a wind turbine.

In another aspect, a controller is described. The controller is configured to control a ramp rate of a wind farm by predicting an initial predicted power to be output by the wind farm including a wind turbine.

In yet another aspect, a wind farm is described. The wind farm includes a wind turbine including at least two rotor blades. The wind farm also includes a controller coupled to the wind turbine and configured to control a ramp rate of the wind farm by predicting an initial predicted power to be output by the wind farm.

DETAILED DESCRIPTION OF THE INVENTION

Figure 1:
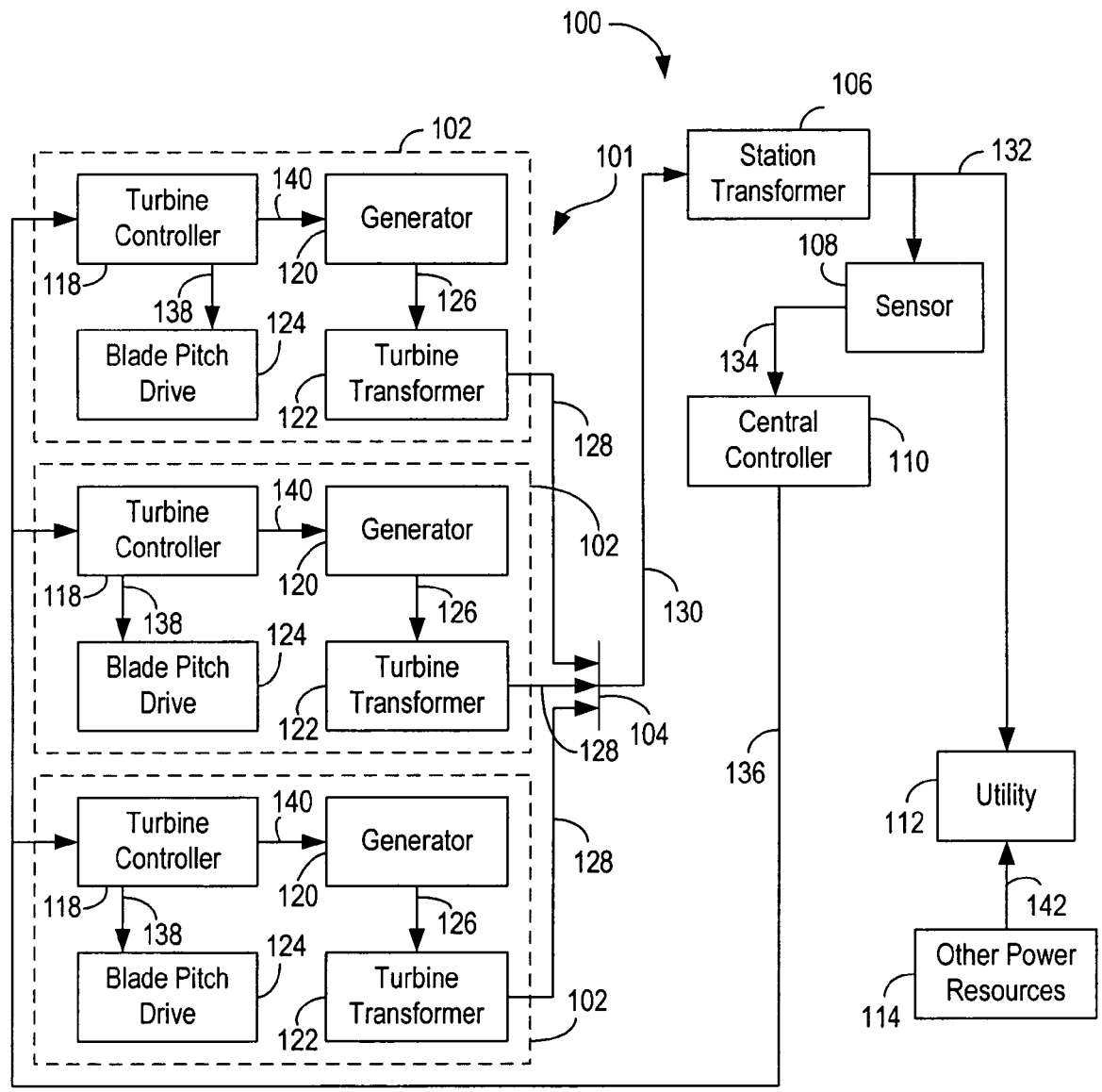
FIG. 1 is a block diagram of an embodiment of a system for controlling a ramp rate of a wind farm.

FIG. 1 is a block diagram of an embodiment of a system 100 for controlling a ramp rate of a wind farm. System 100 includes a wind farm 101 that includes a plurality of wind turbines 102. System 100 further includes a feeder 104, a station transformer 106, a sensor 108, a central controller 110, a utility 112, and power sources 114 other than wind turbines 102. Each wind turbine 102 includes a turbine controller 118, a generator 120, a turbine transformer 122, and a variable blade pitch drive 124. As used herein, the term controller is not limited to just those integrated circuits referred to in the art as a controller, but broadly refers to a processor, a microcontroller, a microcomputer, a programmable logic controller, an application specific integrated circuit, and any other programmable circuit. Examples of power resources 114 include a thermal station, a hydroelectric station, and a nuclear power station. Examples of the thermal station include a coal-fired station and a gas-fired station. Utility 112 is a load, such as a plurality of houses or business, that utilizes energy. Sensor 108 can be a power meter that measures power in kilowatts (kW). In an alternative embodiment, wind farm 101 may include any number, such as one, two, four, six, ten, one-hundred, or two-hundred, of wind turbines 102.

Generator 120 outputs a generator output signal 126. Turbine transformer 122 receives generator output signal 126 and converts a voltage of generator output signal 126 from a low voltage to a voltage higher than the low voltage to generate a turbine transformer output signal 128. Feeder 104 receives turbine transformer output signals 128 and sums turbine transformer output signals 128 to output a feeder output signal 130. Station transformer 106 receives feeder output signal 130 and steps-up a voltage of feeder output signal 130 to generate a station transformer output signal 132. A voltage of station transformer output signal 132 is compatible with an operation of utility 112. Sensor 108 senses or detects a power of station transformer output signal 132 to generate a sensor output signal 134. Central controller 110 receives sensor output signal 134 and performs a method for controlling a ramp rate of a wind farm to generate a central controller output signal 136.

Turbine controller 118 receives central controller output signal 136 and outputs a turbine controller output signal 138 to control blade pitch drive 124. Turbine controller 118 also outputs a turbine controller output signal 140 to control generator 120. In an alternative embodiment, turbine controller 118 outputs either turbine controller output signal 138 to control blade pitch drive 124 or outputs turbine controller output signal 140 to control generator 120. Upon receiving turbine controller output signal 140, generator 120 energizes or operates and generator 120 generates generator output signal 126.

Utility 112 receives power from station transformer output signal 132. Utility 112 may also receive power via a power resource output signal 142 produced by power resources 114. Utility 112 receives power resource output signal 142 to accommodate a variability in a power output of station transformer output signal 132 due to changing wind conditions.

Figure 2:
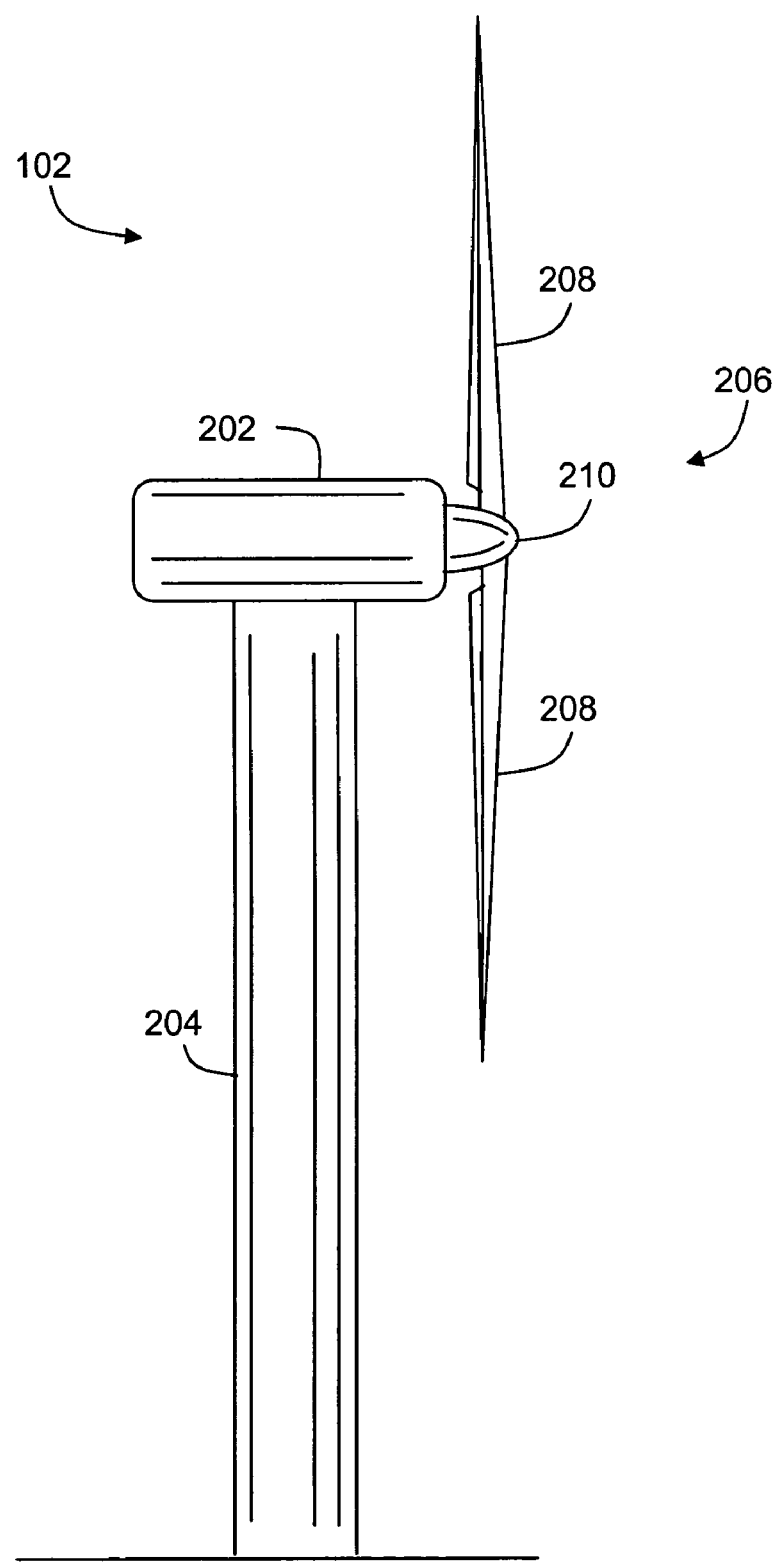
FIG. 2 is a diagram of an embodiment of a wind turbine included within the system of FIG. 1.

FIG. 2 is a diagram of an embodiment of wind turbine 102 including a nacelle 202, a tower 204, a rotor 206 having at least two rotor blades 208 and a rotating hub 210. Nacelle 202 is mounted atop tower 204. Rotor blades 208 are attached to hub 210.

Figure 3:
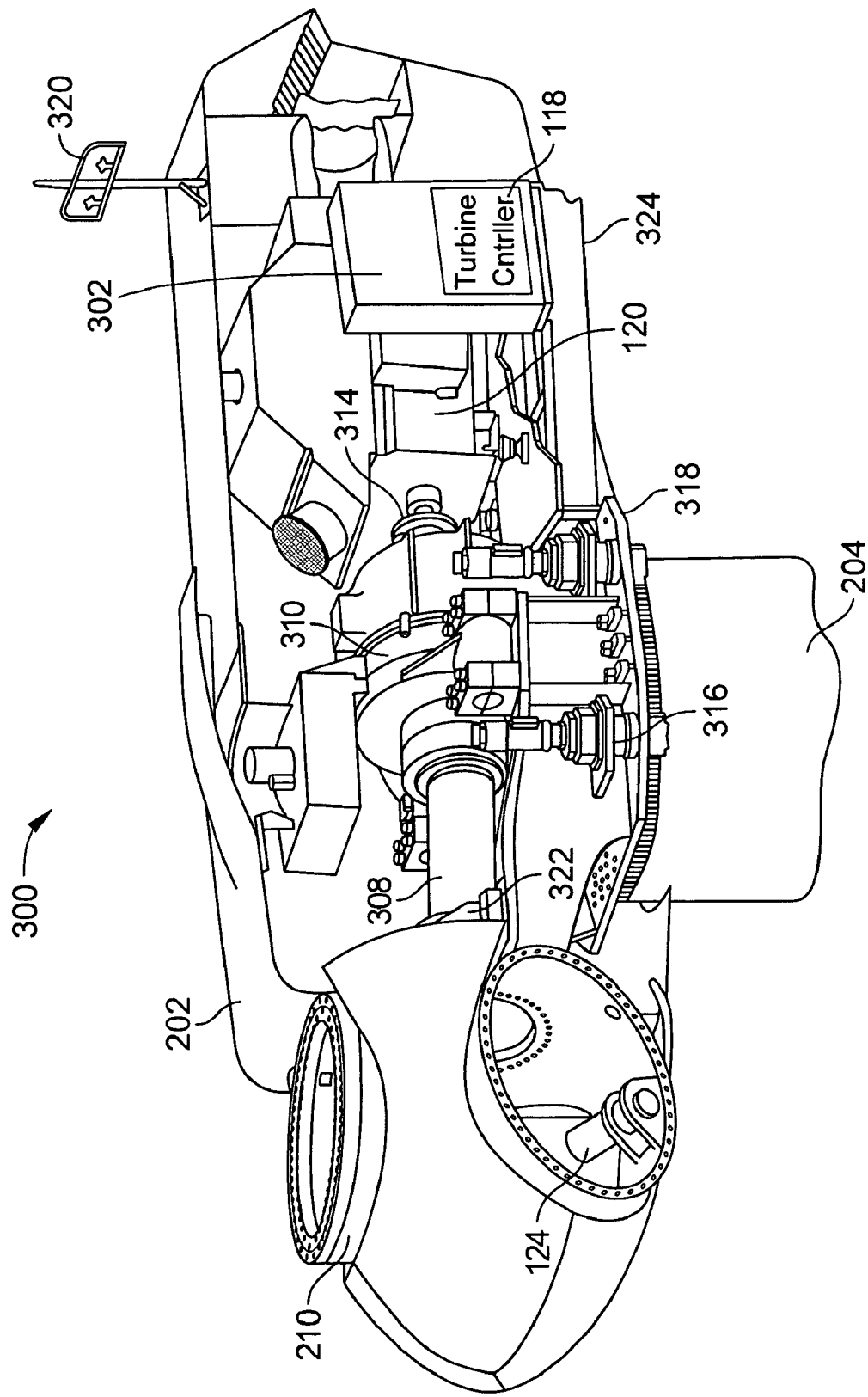
FIG. 3 is a diagram of an embodiment of a system including a nacelle, a tower, and a hub of the wind turbine of FIG. 2.

FIG. 3 is a diagram of an embodiment of a system 300 including nacelle 202, tower 204, and hub 210. Nacelle 202 houses a control panel 302 including turbine controller (turb.

contr.) 118. In an alternative embodiment, turbine controller 118 is located within a main control cabinet at a base of tower 204.

Hub 210 includes blade pitch drive 124. Nacelle 202 also houses a portion of a main rotor shaft 308, a gear box 310, generator 120, and a coupling 314. A yaw drive 316 and a yaw deck 318 are housed within nacelle 202. A metrological boom 320 is coupled to nacelle 202. Nacelle 202 further houses a main bearing 322 and a main frame 324. Turbine controller 118 controls rotor 206 and components housed within nacelle 202.

Blade pitch drive 124 is provided to control an angle or pitch of blades 208 that drive hub 210 as a result of wind. In an alternative embodiment, a plurality of pitches of blades 208 are individually controlled by blade pitch drive 124.

Main rotor shaft 308, which is a low speed shaft, is connected to hub 210 via main bearing 322 and is connected at an opposite end of main rotor shaft 308 to gear box 310. Main rotor shaft 308 rotates with a rotation of hub 210. Gear box 310 utilizes a dual path geometry to drive an enclosed high speed shaft. The high speed shaft is coupled to main rotor shaft 308 and rotates with a rotation of main rotor shaft 308. The high speed shaft operates at a higher speed than main rotor shaft 308. Alternatively, main rotor shaft 308 is coupled directly to generator 120. The high speed shaft is used to drive generator 120, which is mounted on main frame 324. A torque of rotor 206 is transmitted via main rotor shaft 308, the high speed shaft, gear box 310, and coupling 314 to generator 120 that generates generator output signal 126.

Yaw drive 316 and yaw deck 318 provide a yaw orientation system for wind turbine 102. Meteorological boom 320 provides information for turbine controller 118 in control panel 302, and the information includes wind direction and/or wind speed.

Figure 4:
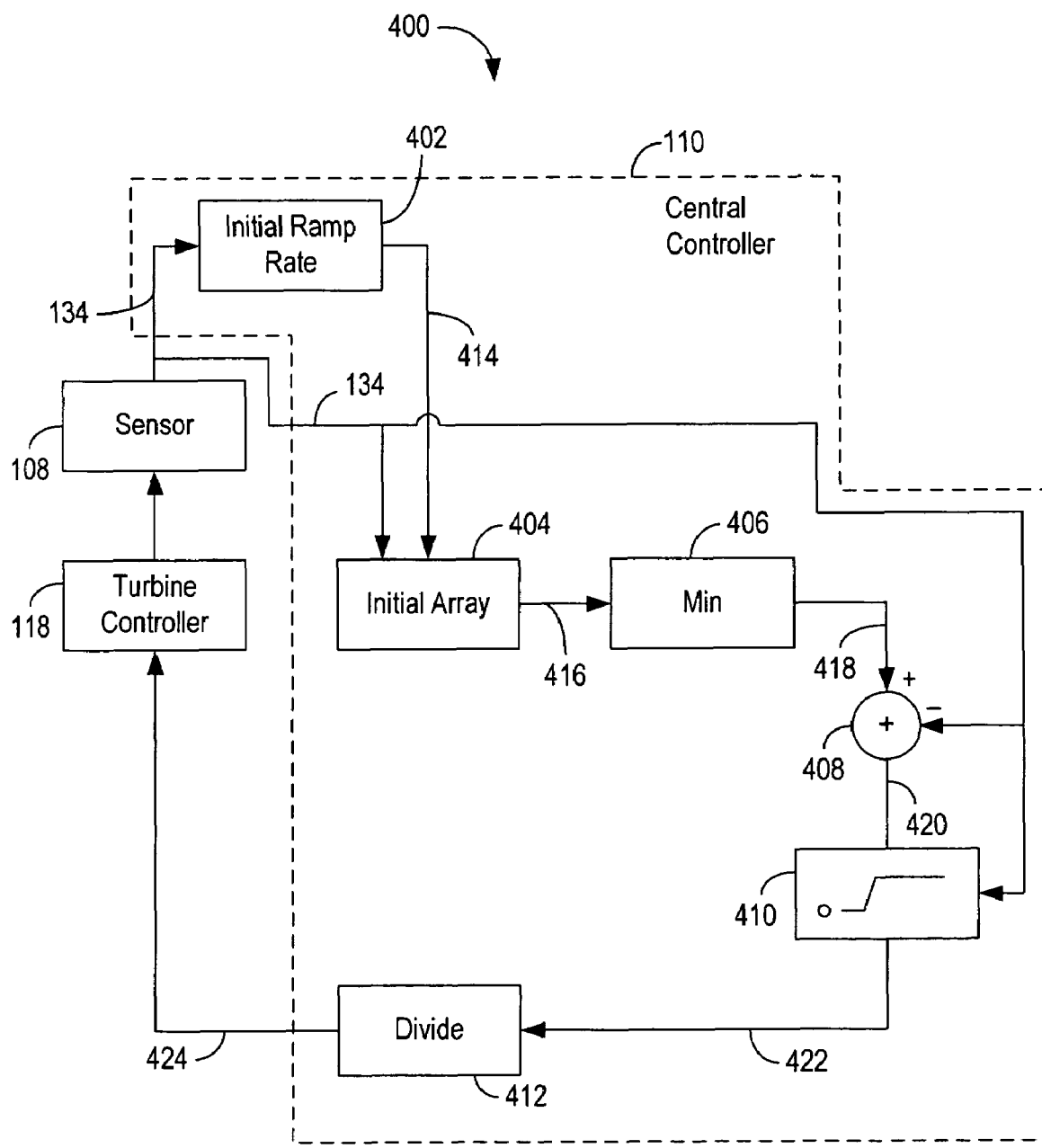
FIG. 4 is a block diagram of another embodiment of a system for controlling a ramp rate of a wind farm.

FIG. 4 is a block diagram of an embodiment of a system 400 for controlling a ramp rate of a wind farm. System 400 includes sensor 108, turbine controller 118, and central controller 110. Central controller 110 includes an initial ramp rate module 402, an initial array module 404, a minimum module 406, an adder module 408, a limiter module 410, and a divider module 412. Each of modules 402, 404, 406, 408, 410, and 412 may be implemented in hardware and/or software.

Sensor 108 outputs sensor output signal 134 with a power of $P_z$ at a time t=0 to initial ramp rate module 402. Initial ramp rate module 402 receives an initial ramp rate of wind farm 101 and outputs the initial ramp rate as an initial ramp rate module output signal 414. A user may provide the initial ramp rate of wind farm 101 to initial ramp rate module 402. Alternatively, initial ramp rate module 402 may electronically receive the initial ramp rate of wind farm 101 from another electronic device that calculates the initial ramp rate. Initial array module 404 receives the initial ramp rate embodied as initial ramp rate module output signal 414. Initial array module 404 generates an initial array from sensor output signal 134 and the initial ramp rate by applying $$P_{z+n} = P_z + (\text{initial ramp rate} \times n) \quad (2)$$

where $P_{z+n}$ is an initial maximum predicted or estimated power of sensor output signal 134 at time t=n after time t=0.

The initial array includes a plurality of values of power. For example, initial array module 404 calculates an additional maximum predicted power by applying $$P_{z+m+n} = P_{z+m} + (\text{initial ramp rate} \times n) \quad (3)$$

where $P_{z+m}$ is a power of sensor output signal 134 at time t=m, $-n \leq m < 0$, $P_{z+m+n}$ is the additional maximum predicted powers of sensor output signal 134 at time t=m+n ranging from time t=0 to t=n. Alternatively, the initial array includes one value of power, such as $P_{z+n}$ or alternatively $P_{z+m+n}$. Initial array module 404 generates the maximum predicted powers from $P_z$ to $P_{z+n}$ that may not be exceeded during the time interval from t=0 to t=n. Minimum module 406 receives an initial array module output signal 416 and selects a minimum of the maximum predicted powers ranging from $P_z$ to $P_{z+n}$ within the initial array to generate a minimum module output signal 418.

Adder module 408 receives minimum module output signal 418 and sensor output signal 134, and subtracts sensor output signal 134 from minimum module output signal 418 to generate an adder output signal 420. Limiter module 410 receives adder output signal 420 and sensor output signal 134, and determines whether adder output signal 420 has a positive or a negative value. Adder output signal 420 has a positive value if minimum output signal has an amplitude at least equal to an amplitude of sensor output signal 134. On the other hand, adder output signal 420 has a negative value if minimum output signal has a lower amplitude than an amplitude of sensor output signal 134. Upon determining that adder output signal 420 has a positive value, limiter module 410 does not change the initial ramp rate and outputs the initial ramp rate as a limiter module output signal 422. On the other hand, upon determining that adder output signal 420 has a negative value, limiter module 410 changes the initial ramp rate to a zero ramp rate, having a zero value, which is output as limiter module output signal 422.

Divider module 412 receives limiter module output signal 422 and divides limiter module output signal 422 by a number of wind turbines 102 that are energized or operating in wind farm 101. As an example, divider module 412 divides the initial ramp rate by a number of wind turbines 102 that are energized within wind farm 101. As another example, divider module 412 divides the zero ramp rate by a number of wind turbines 102 that are energized within wind farm 101. Divider module 412 divides limiter module output signal 422 by a number of wind turbines 102 that are energized at the time of performing the division. Divider module 412 divides limiter module output signal 422 by a number of wind turbines 102 to generate a divider module output signal 424. Divider module output signal 424 is an example of central controller output signal 136.

Turbine controller 118 receives divider module output signal 424 and controls blade pitch drive 124 and/or generator 120 to control the initial ramp rate of wind turbine 102. For example, upon receiving the initial ramp rate per turbine, turbine controller 118 maintains the initial ramp rate per turbine. As another example, upon receiving the zero ramp rate, turbine controller 118 changes the initial ramp rate per turbine to the zero ramp rate.

Figure 5:
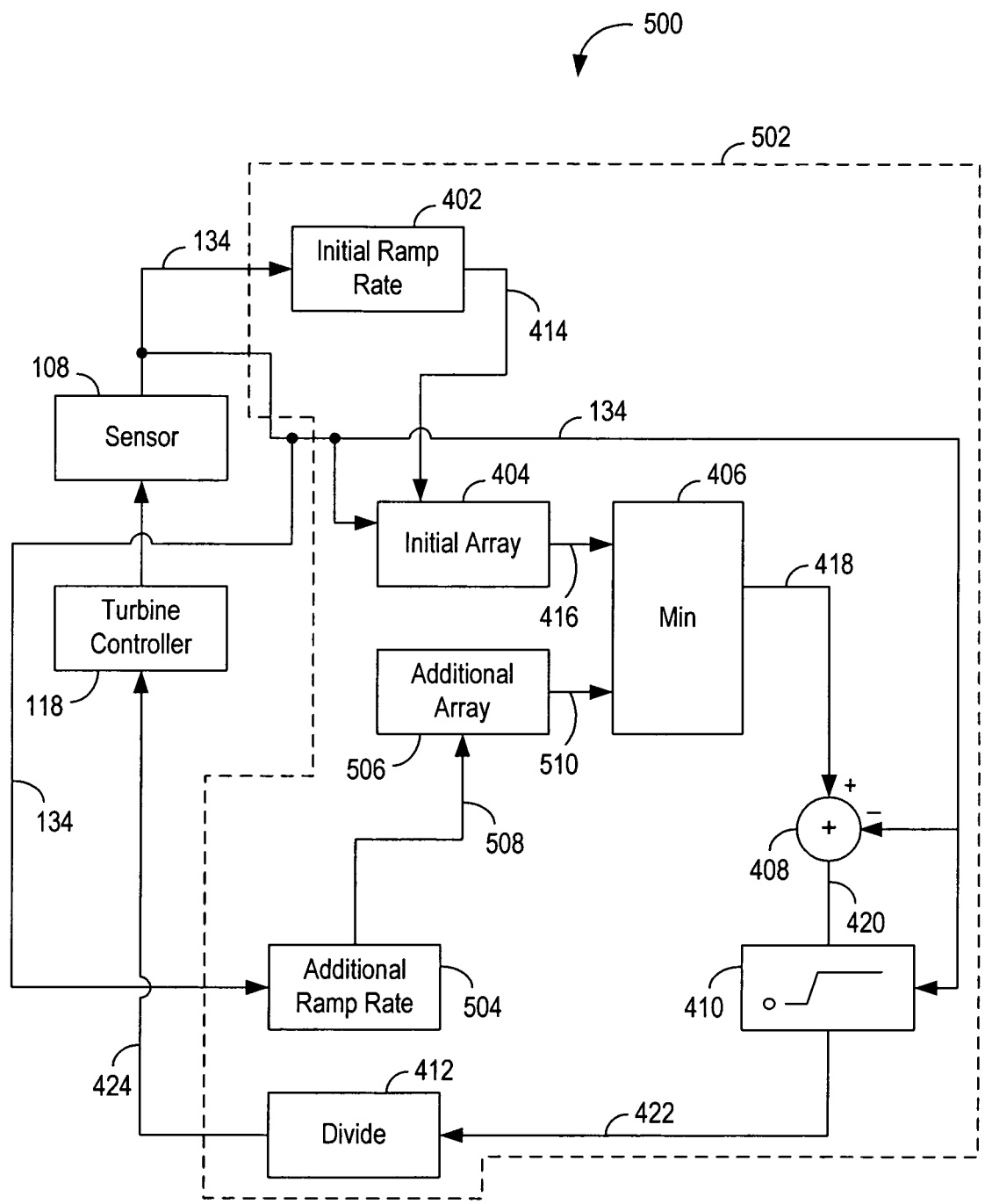
FIG. 5 is a block diagram of yet another embodiment of a system for controlling a ramp rate of a wind farm.

FIG. 5 is a block diagram of an embodiment of a system 500 for controlling a ramp rate of a wind turbine. System 500 includes a central controller 502, sensor 108, and turbine controller 118. Central controller 502 is an example of central controller 110. Central controller 502 includes initial ramp rate module 402, initial array module 404, minimum module 406, adder module 408, limiter module 410, divider module 412, an additional ramp rate module 504, and an additional array module 506. Each of additional ramp rate module 504 and additional array module 506 can be implemented in hardware and/or software. In an alternative embodiment, system 500 includes more than two, such as from and including three to ten, additional array modules, such as additional array module 506. Moreover, in the alternative embodiment, system 500 also includes more than two, such as from and including three to ten, additional ramp rate modules, such as additional ramp rate module 504.

Sensor 108 outputs sensor output signal 134 with the power of $P_z$ at time t=0 to additional ramp rate module 504. Additional ramp rate module 506 receives an additional ramp rate of wind farm 101 and outputs the additional ramp rate as an additional ramp rate module output signal 508. A user may provide the additional ramp rate of wind farm 101 to additional ramp rate module 506. Alternatively, additional ramp rate module 506 may electronically receive the additional ramp rate of wind farm 101 from another electronic device that calculates the additional ramp rate. The additional ramp rate has a different value than the initial ramp rate. Additional array module 506 receives the additional ramp rate embodied as additional ramp rate module output signal 508. Additional array module 506 generates an additional array from sensor output signal 134 and additional ramp rate module output signal 508 by applying $$P_{z+q} = P_z + (\text{additional ramp rate} \times q) \quad (5)$$

where $P_{z+q}$ is an additional maximum predicted or estimated power of sensor output signal 134 at time t=q after time t=z.

The additional array includes a plurality of values of power. For example, additional array module 506 calculates an additional maximum predicted power by applying $$P_{z+m+q} = P_{z+m} + (\text{additional ramp rate} \times q) \quad (6)$$

where $P_{z+m+q}$ is a plurality of additional maximum predicted powers of sensor output signal 134 at time t=m+q ranging from time t=z to t=q, and $-q \leq m < 0$. Alternatively, the additional array includes one value of power, such as $P_{z+q}$ or alternatively $P_{z+m+q}$. Additional array module 506 generates the additional maximum predicted powers ranging from $P_z$ to $P_{z+q}$ within the additional array to output an additional array module output signal 510.

Minimum module 406 receives initial array module output signal 416 and additional array module output signal 510, and selects a minimum from the maximum predicted powers ranging from $P_z$ to $P_{z+n}$ within the initial array and the additional predicted powers ranging from $P_z$ to $P_{z+q}$ within the additional array to generate minimum module output signal 418.

Figure 6:
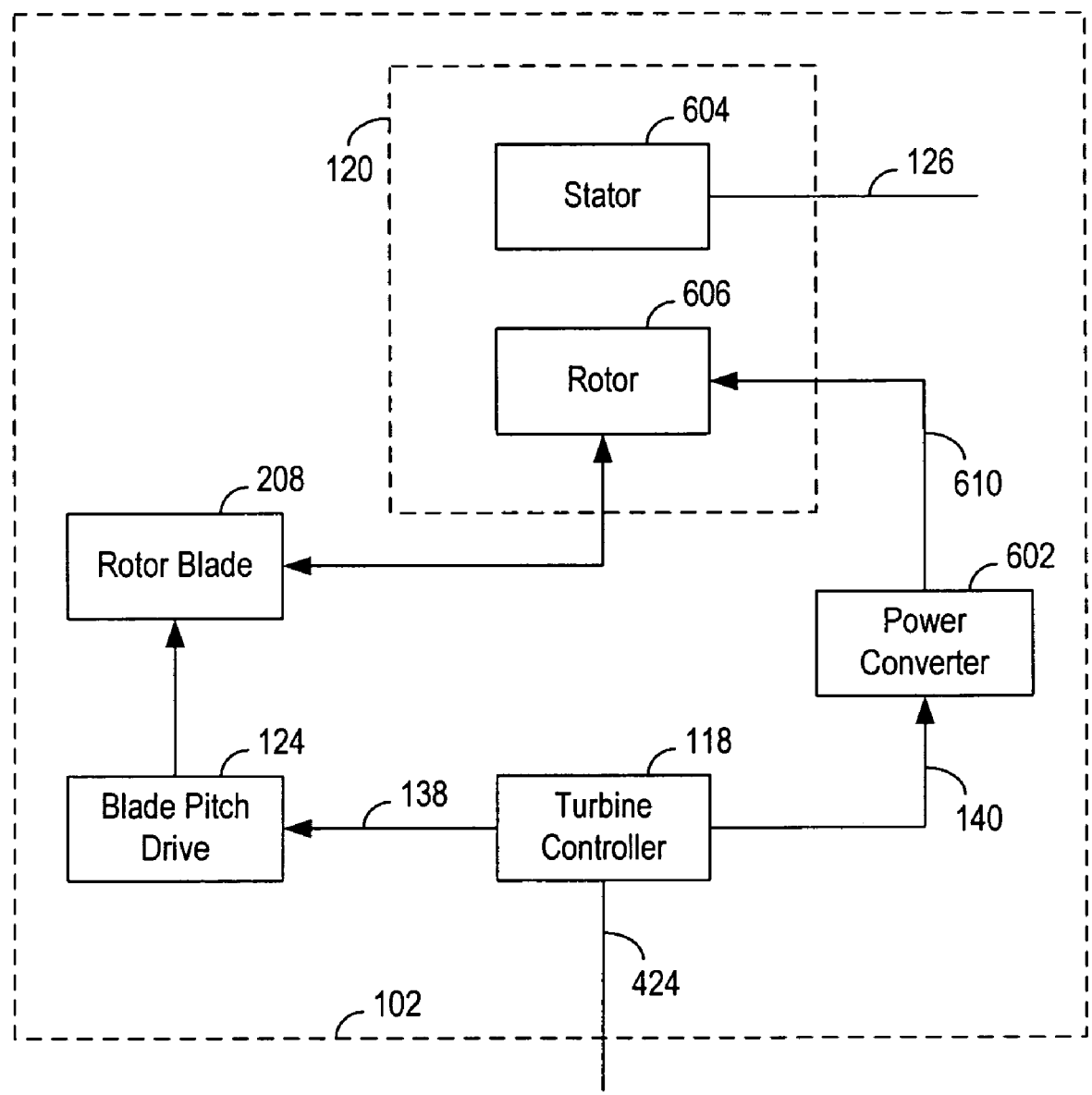
FIG. 6 is a block diagram of an embodiment of the wind turbine of FIG. 2.

FIG. 6 is a block diagram of an embodiment of wind turbine 102. Wind turbine 102 includes a power converter 602, generator 120, rotor blade 208, blade pitch drive 124, and turbine controller 118. In an alternative embodiment, power converter 602 may be included within turbine controller 118. Generator 120 includes a stator 604 and a rotor 606. Turbine controller 118 receives divider module output signal 424 and generates turbine controller output signal 138, which includes an angle command having an angle ranging from and including zero degrees to ninety degrees. For example, turbine controller 118 converts a ramp rate from divider module output signal 424 into a power command that is increased from its current value by the ramp rate received from divider module output signal 424. The power output of wind turbine 102 is controlled to conform to the power command generated in the turbine controller 118. Blade pitch drive 124 receives turbine controller output signal 138 and drives rotor blade 208 to change a position of rotor blade 208 to the angle within the angle command.

Turbine controller 118 also generates turbine controller output signal 140. For example, turbine controller 118 converts the power command by dividing the power command by the rotor speed into an amount of torque producing current that is supplied to a plurality of windings of rotor 606 and supplies the amount of current as turbine controller output signal 140. Power converter 602 receives turbine controller output signal 140 and generates the amount of current that is sent to the windings of rotor 606 as a power converter output signal 610. The amount of current is in phase with a current within a plurality of winding of stator 604. In an alternative embodiment, turbine controller 118 controls either an angle of rotor blade 208 or the current within rotor 606.

Technical effects of the herein described systems and methods for controlling a ramp rate of a wind turbine include detecting that wind farm 101 is about to approach a ramp rate limit and capping a power produced by wind farm 101 until such a time has elapsed that a ramp rate of wind farm 101 is far below the ramp rate limit and wind turbines 102 can increase their power output. Other technical effects include applying multiple ramp rates, such as, the initial and additional ramp rates, simultaneously.

While the invention has been described in terms of various specific embodiments, those skilled in the art will recognize that the invention can be practiced with modification within the spirit and scope of the claims.

What is claimed is:

1. A method for controlling a ramp rate of a wind farm that includes at least one wind turbine, said method comprising:
   estimating an initial predicted power output limit as a function of ramp rate and an instantaneous power output, said estimating an initial predicted power output limit comprising;
   estimating a first predicted power output limit as a function of a first instantaneous power output;
   estimating a second predicted power output limit as a function of a second instantaneous power output;
   selecting a lower of the first and second predicted power output limits; and
   comparing a second instantaneous power output to the lower of the first and second predicted power output limits; and
   controlling a ramp rate of the at least one wind turbine based on the lower of the first and second predicted power output limits.

2. A method in accordance with claim 1 wherein estimating an initial predicted power output limit comprises estimating at least one predicted power output limit before an instantaneous power output is generated by the wind farm.

3. A method in accordance with claim 1 wherein estimating an initial predicted power output limit comprises estimating the first predicted power output limit at a first time and the second predicted power output limit at a second time, wherein the first time occurs before the first instantaneous power output is generated and the second time occurs before the second instantaneous power output is generated.

4. A method in accordance with claim 1 wherein estimating an initial predicted power output limit comprises estimating the first predicted power output limit as a function of a first time range and estimating the second predicted power output limit as a function of a second time range, wherein the second predicted power output limit is estimated at a time that is different than the time in estimating the first predicted power output limit.

5. A method in accordance with claim 1 wherein the second predicted power output limit is estimated at a time different from the time estimating the first predicted power output limit.

6. A method in accordance with claim 1 wherein estimating an initial predicted power output limit further comprises:
   estimating a third predicted power output limit as a function of at least one instantaneous power output;

estimating a fourth predicted power output limit as a function of at least one instantaneous power output; and
selecting a lower of the first, second, third, and fourth predicted power output limits.

7. A method in accordance with claim 1 wherein comparing a second instantaneous power output to the lower of the first and second predicted power output limits comprises transmitting to a ramp rate selection device a difference between the second instantaneous power output and the lower of the first and second predicted power output limits.

8. A method in accordance with claim 7 wherein transmitting to a ramp rate selection device comprises determining a second ramp rate based on the difference.

9. A method in accordance with claim 8 wherein determining a second ramp rate further comprises one of:
   generating a second ramp rate that is substantially similar to a first ramp rate upon receiving a positive difference; and
   generating a second ramp rate that is approximately equal to a zero value upon receiving a negative difference.

10. A controller configured to facilitate control of a ramp rate of a wind farm that includes at least one wind turbine, said controller comprising:
    an initial array module configured to generate a plurality of predicted power output limits;
    a minimum module configured to select a lowest value of the plurality of predicted power output limits;
    an adder module configured to determine a difference between an instantaneous power output and the lowest value of the plurality of predicted power output limits; and
    at least one module configured to control a ramp rate of the at least one wind turbine based on the lowest value of the plurality of predicted power output limits.

11. A controller in accordance with claim 10 wherein said at least one module comprises at least one ramp rate module, said at least one ramp rate module is configured to transmit to an initial array at least one ramp rate signal.

12. A controller in accordance with claim 10 wherein said at least one module comprises at least one array module configured to estimate at least one predicted power output limit.

13. A controller in accordance with claim 10 wherein said at least one module comprises a divider module configured to divide a second output ramp rate by a number of operating turbines in the wind farm.

14. A controller in accordance with claim 13 further comprising a limiter module configured to generate at least one of:
    the second output ramp rate that is substantially similar to a first ramp rate upon receiving a positive difference; and
    the second output ramp rate that is approximately equal to a zero value upon receiving a negative difference.

15. A wind farm comprising:
    at least one wind turbine; and
    a controller coupled to said at least one wind turbine and configured to control a ramp rate of said wind farm, said controller comprising:
        an initial array module configured to generate a plurality of predicted power output limits;
        a minimum module configured to select a lowest value of the plurality of predicted power output limits;
        an adder module configured to determine a difference between an instantaneous power output and the lowest value of the plurality of predicted power output limits; and
        at least one module configured to control a ramp rate of the at least one wind turbine based on the lowest value of the plurality of predicted power output limits.

16. A wind turbine farm in accordance with claim 15 wherein said at least one module comprises at least one ramp rate module, said at least one ramp rate module is configured to transmit to an initial array at least one ramp rate signal.

17. A wind turbine farm in accordance with claim 15 wherein said at least one module comprises at least one array module configured to estimate at least one predicted power output limit.

18. A wind turbine farm in accordance with claim 15 wherein said at least one module comprises a divider module configured to divide a second output ramp rate by a number of operating wind turbines in said wind farm.

19. A wind turbine farm in accordance with claim 18 further comprising a limiter module configured to generate at least one of:
    the second output ramp rate that is substantially similar to a first ramp rate upon receiving a positive difference; and
    the second output ramp rate that is approximately equal to a zero value upon receiving a negative difference.

* * * * *